(12) United States Patent
Ochiai et al.

(10) Patent No.: US 8,128,078 B2
(45) Date of Patent: Mar. 6, 2012

(54) JIG

(75) Inventors: Hiroyuki Ochiai, Tokyo (JP);
Mitsutoshi Watanabe, Tokyo (JP);
Takashi Furukawa, Tokyo (JP)

(73) Assignee: IHI Corporation, Tokyo (JP)

( * ) Notice: Subject to any disclaimer, the term of this patent is extended or adjusted under 35 U.S.C. 154(b) by 1017 days.

(21) Appl. No.: 11/908,217

(22) PCT Filed: Mar. 8, 2006

(86) PCT No.: PCT/JP2006/304462
§ 371 (c)(1),
(2), (4) Date: Mar. 3, 2008

(87) PCT Pub. No.: WO2006/095767
PCT Pub. Date: Sep. 14, 2006

(65) Prior Publication Data
US 2009/0267279 A1    Oct. 29, 2009

(30) Foreign Application Priority Data

Mar. 9, 2005  (JP) .............................. P2005-066315

(51) Int. Cl.
*B23Q 3/00* (2006.01)

(52) U.S. Cl. ..................................... 269/287; 29/281.1

(58) Field of Classification Search .................. 269/287, 269/903, 309–310; 29/281.1; 219/66.15; 156/295; 361/234
See application file for complete search history.

(56) References Cited

U.S. PATENT DOCUMENTS

| 4,464,094 | A |   | 8/1984  | Gerken |
|-----------|---|---|---------|--------|
| 5,121,580 | A |   | 6/1992  | Bellenoue et al. |
| 5,893,984 | A | * | 4/1999  | Thompson .................. 219/69.15 |
| 6,206,634 | B1 |  | 3/2001  | Doi et al. |
| 6,511,574 | B2 | * | 1/2003  | Barringer et al. ............. 156/295 |
| 6,602,561 | B1 |  | 8/2003  | Moro et al. |
| 6,992,876 | B1 | * | 1/2006  | Nakajima et al. ............. 361/234 |
| 2002/0130061 | A1 | * | 9/2002 | Hengst .......................... 206/710 |
| 2009/0267279 | A1 | * | 10/2009 | Ochiai et al. ................. 269/287 |

FOREIGN PATENT DOCUMENTS

| GB | 950506       | 2/1964 |
| JP | 63 209903    | 8/1988 |
| JP | 1-209739     | 8/1989 |
| JP | 3 194102     | 8/1991 |
| JP | 11 229160    | 8/1999 |
| JP | 2000 71126   | 3/2000 |
| JP | 2001-206771  | 7/2001 |
| JP | 2002 1435    | 1/2002 |
| JP | 2003 270081  | 9/2003 |

(Continued)

OTHER PUBLICATIONS

Extended European Search Report issued Jan. 24, 2011, in U.S. Appl. No. 06715382.5.

(Continued)

*Primary Examiner* — Lee D Wilson
(74) *Attorney, Agent, or Firm* — Oblon, Spivak, McClelland, Maier & Neustadt, L.L.P.

(57) ABSTRACT

A jig for fixing a subject body, is provided with a support block configured to support the subject body, which includes a support face, a coating discharge-deposited to coat the support face, which includes a ceramic, and a fixation member configured to fix the subject body in cooperation with the support block.

10 Claims, 4 Drawing Sheets

FOREIGN PATENT DOCUMENTS

| | | |
|---|---|---|
| JP | 2005 2880 | 1/2005 |
| TW | 384250 | 3/2000 |
| TW | 424620 | 3/2001 |
| TW | 482045 | 4/2002 |
| TW | 529497 | 4/2003 |
| WO | WO 2004/108354 | 12/2004 |
| WO | WO 2004/111394 A1 | 12/2004 |

OTHER PUBLICATIONS

Office Action issued on Sep. 27, 2011 in the corresponding Japanese Application No. 2007-507146 (with English Translation).

* cited by examiner

ID

JIG

TECHNICAL FIELD

The present invention relates to a jig for fixing a machine component at a time of executing any treatments such as machining and inspection with respect to the machine component.

BACKGROUND ART

Machine components such as components of a gas turbine engine have frequent chances of being fixed for the purpose of executing machining and inspection. A jig for fixation is provided with a plurality of support blocks, with which support portions of any so-called hard metal are brazed so as to prevent abrasion and deformation caused by pressurized contact with the machine components. Each of the support portions has a plurality of grooves formed thereon for suppressing saccadic movement.

The support portions, as being made of a hard metal, effectively prevent abrasion and deformation of themselves but easily give damages such as scratch and deformation to the machine components. Further, as the hard metal is far costlier than steels or such and gives rise to technical difficulty in brazing with steels or such, use of the hard metal would not be favorable in view of its cost and technical difficulty.

DISCLOSURE OF INVENTION

The present invention has an object for providing a jig which effectively suppresses saccadic movement of a subject body without applying a hard metal and further fixes the subject body with giving small abrasion and deformation thereto.

According to a first aspect of the present invention, a jig for fixing a subject body is provided with a support block configured to support the subject body, which includes a support face, a coating discharge-deposited to coat the support face, which includes a ceramic, and a fixation member configured to fix the subject body in cooperation with the support block.

Preferably, the coating has a roughness of 0.4 μm or more and 3.2 μm or less in Ra. Still preferably, the coating consists essentially of one selected from the group of titanium carbide, silicon carbide and tungsten carbide. Further preferably, the coating is formed by executing discharge deposition from a working electrode consisting essentially of titanium carbide onto the support face with applying the support block as a workpiece. Alternatively preferably, the coating is formed by executing discharge deposition from a working electrode consisting essentially of silicon onto the support face in an oil with applying the support block as a workpiece. More preferably, the coating is formed only on the support face.

BEST MODE FOR CARRYING OUT THE INVENTION

Throughout the specification and claims, several terms are used in accordance with the following definitions. The term "discharge deposition" is defined and used as use of discharge in an electric spark machine for wearing an electrode instead of machining a workpiece to deposit a material of the electrode or a reaction product between the material of the electrode and a machining liquid or a machining gas on the workpiece. Further, the term "discharge-deposit" is defined and used as a transitive verb of the term "discharge deposition". Furthermore, the phrase "consist essentially of" means to partially closely regulate ingredients, namely, to exclude additional unspecified ingredients which would affect the basic and novel characteristics of the product defined in the balance of the claim but permit inclusion of any ingredients, such as impurities, which would not essentially affect the characteristics.

In certain embodiments of the present invention, an electric spark machine (most of it will be not shown) is used for executing discharge deposition. In discharge deposition, a subject body is set in an electric spark machine as a workpiece thereof, and made closed to a working electrode in a processing bath. Then, in a case of general spark machining, pulsing current is supplied from an external power source to generate pulsing discharge between the workpiece and the working electrode so as to wear the workpiece, thereby the workpiece is machined into a shape complementary to a tip of the working electrode. In contrast, in the discharge deposition, the working electrode instead of the workpiece is worn and a material of the working electrode, or a reaction product between the material of the electrode and a machining liquid or a machining gas is made deposited on the workpiece. The deposit thereby is not only adhered on the workpiece but also may simultaneously undergo phenomena diffusion, weld and such between the deposit and the workpiece and further among particles in the deposit mutually by using energy of the discharge in part.

An embodiment of the present invention will be described hereinafter with reference to FIG. 1 through FIG. 5. In these drawings, an arrow referred by "FF" denotes a forward direction, an arrow "FR" denotes a rearward direction, an arrow "L" denotes a leftward direction, and an arrow "R" denotes a rightward direction. Further, in FIG. 2, a cross defined by a circle denotes an arrow approaching toward the paper face and a solid circle defined by a circle denotes an arrow departing from the paper face.

In the following description, an example in which a blade component as an engine component of a gas turbine engine is a subject for being fixed to a jig will be illustrated.

Figure 1:
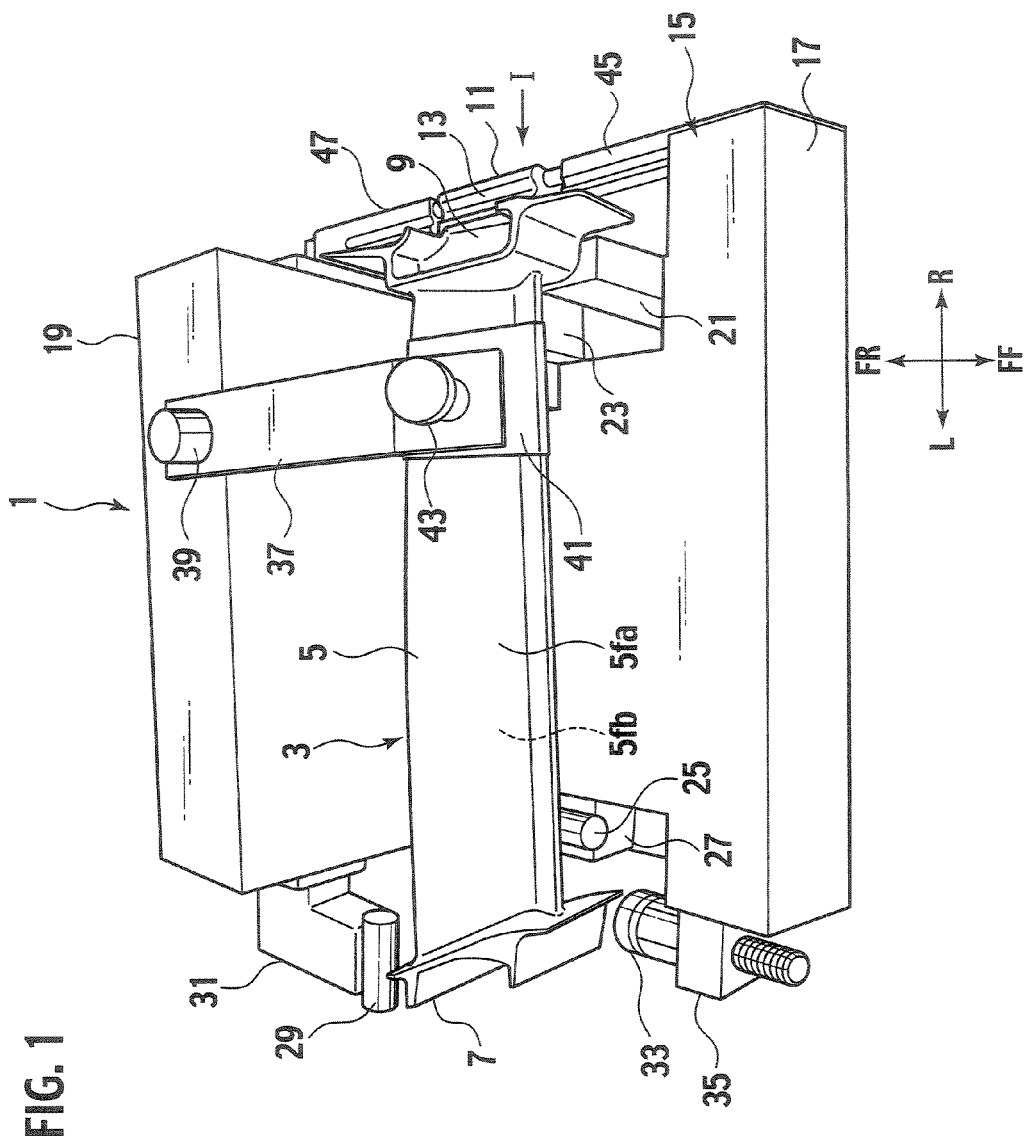
FIG. 1 is a perspective view of a jig in accordance with an embodiment of the present invention.
Figure 2:
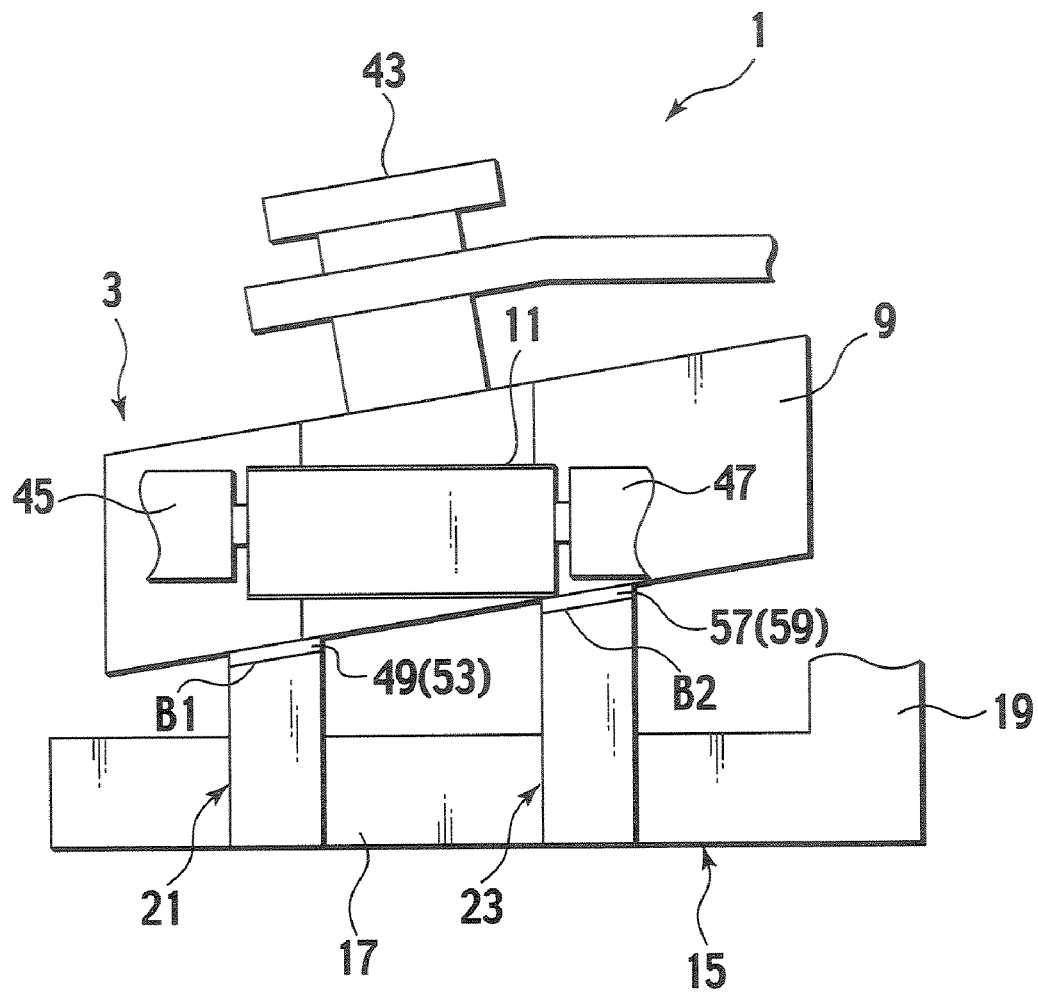
FIG. 2 is a view taken along an arrow I of FIG. 1.
Figure 3:
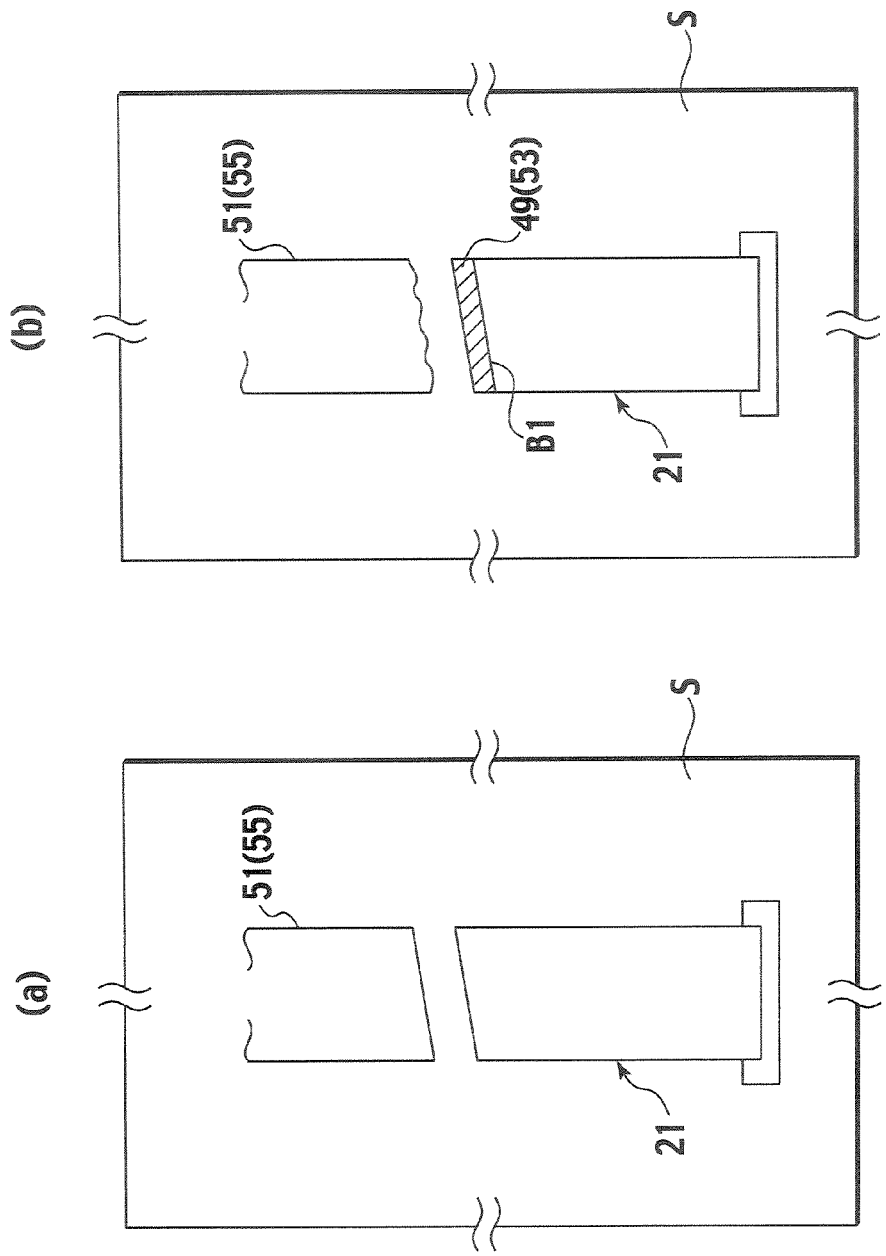
FIG. 3 is a drawing explaining steps for forming a first protective thin film.

As shown in FIG. 1 and FIG. 2, a jig 1 in accordance with the embodiment of the present invention fixedly holds a blade component 3 at a predetermined site thereof. Here, the blade component 3 is provided with a blade 5, a shroud 7 formed in a unitary body with a distal end of the blade 5, a platform 9 formed in a unitary body with a proximal end of the blade 5, and a blade root 11 formed in a unitary body with the platform 9. The blade 5 has a pressure side 5fa and a suction side 5fb, and a fitting groove 13 is formed on the blade root 11 by means of machining (FIG. 3 shows the blade component 3 after machining).

The jig 1 is provided with a jig main body 15, which is provided with a base stand 17 of steel and a vertical plate 19 formed in a standing condition at a rear portion of the base stand 17.

At the right of the base stand 17, a first support block 21 for supporting a front portion of the platform 9 is provided. The first support block 21 generally essentially consists of steel. Similarly, at the right of the base stand 17, a second support block 23 for supporting a rear portion of the platform 9 is provided. The second support block 21 generally essentially consists of steel. Meanwhile, constitutions of the first support block 21 and the second support block 23 will be later described in detail.

At the left of the base stand 17, a first support roller 25 for supporting the suction side 5fb of the blade 5 is provided with having a bracket 27 interposed. At the left of the vertical plate 19, a second support roller 29 for supporting a rear edge of the shroud 7 is provided with having a bracket 31 interposed. Further, at the left of the base stand 17, a support bolt 33 for supporting a front edge of the shroud 7 is provided with having a bracket 35 interposed.

Further, at an upper portion of the vertical plate 19, an arm 37 is provided by means of an installation bolt 39. At a distal end of the arm 37, a pressure bolt 43 for pressing a portion near the proximal end of the blade 5 toward the base stand 17 (downward in the drawings) via a rubber pad 41 is provided. Moreover, at the right of the base stand 17, a pair of clamp bars 45, 47 for cramping the blade root 11 from the front and the rear is provided.

Next, the constitutions of the first support block 21 and the second support block 23 will be described in detail.

As shown in FIG. 2, on a support face of the first support block 21, a first protective thin film 49 of TiC (titanium carbide) is formed by discharge deposition so as to coat the support face. More concretely, as shown in FIGS. 3(a)(b), the support face of the first support block 21 is made opposed to a working electrode 51 in an electric spark machine and pulsing discharge is generated between the support face of the first support block 21 and the working electrode 51 in an electrically insulating liquid S so that the first protective thin film 49 is formed to coat the support face.

Here, the working electrode 51 is a molded body made by pressing a powder consisting essentially of TiC or the molded body treated with heat treatment so as to be sintered at least in part. Meanwhile, the working electrode 51 may be formed by slurry pouring, MIM (Metal Injection Molding), spray forming and such, instead of pressing.

Meanwhile, instead of the electrically insulating liquid S, an electrically insulating gas may be applied.

Further, on the support face of the first support block 21, a first protective thin film 53 consisting essentially of SiC (silicon carbide) may be formed by discharge deposition instead of the first protective thin film 49 consisting essentially of TiC. More concretely, as shown in FIGS. 3(a)(b), the support face of the first support block 21 is made opposed to a working electrode 55 consisting essentially of Si (silicon) in the electric spark machine and pulsing discharge is generated between the support face of the first support block 21 and the working electrode 55 in an oil S including alkane hydrocarbon so that the first protective thin film 53 is formed to coat the support face.

Here, the working electrode 55 is a molded body made by pressing a powder consisting essentially of Si (silicon) or the molded body treated with heat treatment so as to be sintered at least in part. Meanwhile, the working electrode 55 may be formed by slurry pouring, MIM (Metal Injection Molding), spray forming and such, instead of pressing.

Still further, instead of the first protective thin film 49 or 53, a first protective thin film consisting essentially of WC (tungsten carbide) may be applied. In this case, a working electrode including WC instead of TiC is employed. The working electrode, for example, is a molded body made by pressing a powder consisting essentially of 90% of TiC and 10% of Co (cobalt) in weight ratio or the molded body treated with heat treatment so as to be sintered at least in part.

Similarly, on a support face of the second support block 23, a second protective thin film 57 consisting essentially of TiC or a second protective thin film 59 consisting essentially of Si is formed by discharge deposition so as to coat the support face. The second protective thin film may consists essentially of WC.

Further, the first protective thin film 49 (or 53) and the second protective thin film 57 (or 59) respectively have proper surface roughness so as to prevent slipping of the subject body and suppress scratch on the subject body. The surface roughness is preferably 0.4 μm or more and 3.2 μm or less in Ra. The ground thereof is that, if the surface roughness Ra is less than 0.4 μm, slipping of the blade component 3 is uneasy to be sufficiently suppressed and, if the surface roughness Ra is larger than 3.2 μm, scratch on the subject body becomes striking.

Moreover, at a boundary between the first protective thin film 49 (or 53) and a base of the first support block 21, and at a boundary between the second protective thin film 57 (or 59) and a base of the second support block 23, fusion parts (fusion layers) B1, B2 in which the composition ratio grades in its thickness direction are respectively formed. They are formed by selecting a proper discharge condition at a time of executing discharge deposition and thickness of the fusion parts B1, B2 is preferably 3 μm or more and 20 μm or less. The proper discharge condition may be that a peak current is 30 A or less and a pulse width is 200 μs or less, and more preferably that a peak current is 20 A or less and a pulse width is 20 μs or less.

Figure 4:
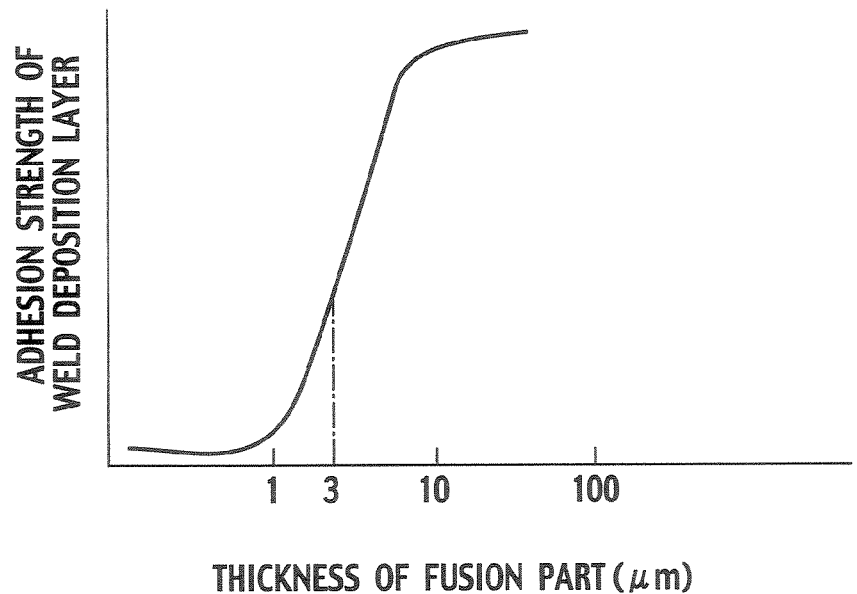
FIG. 4 is a drawing showing a relation between thickness of a fusion part and adhesion strength of a thin film.
Figure 5:
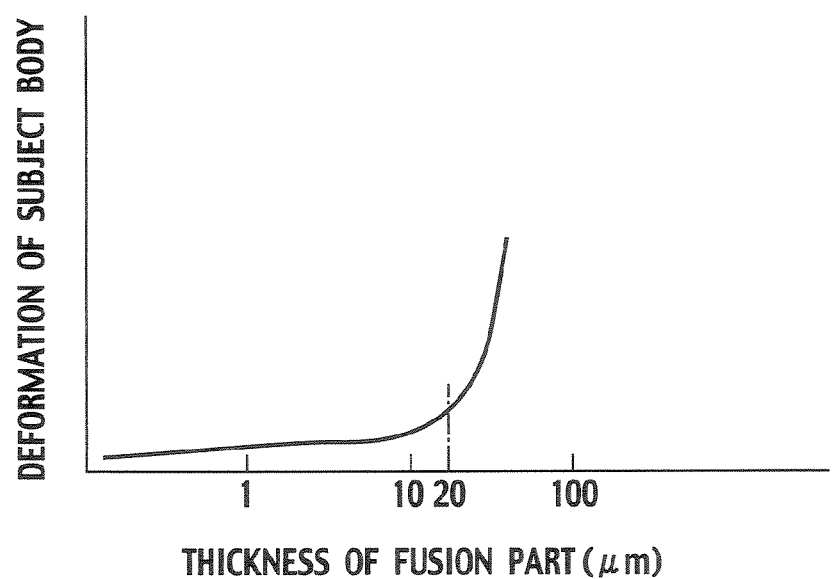
FIG. 5 is a drawing showing a relation between thickness of a fusion part and deformation of a subject body.

Here, a ground on which the thickness of the fusion parts B1, B2 is 3 μm or more and 20 μm or less is based on test results shown in FIG. 4 and FIG. 5.

More specifically, in a case where thin films are formed by means of discharge deposition on various discharge conditions so as to give fusion parts of various thicknesses, thickness of the fusion parts and adhesion strength of the thin films have a relation as shown in FIG. 4. A first knowledge that the adhesion strength of the fusion parts 13 to the thin films goes larger when the thickness of the fusion parts is 3 μm or more is obtained. Further, the thickness of the fusion parts and the deformation of the base of the first support block 21 have a relation as shown in FIG. 5, a second knowledge that deformation of the base of the first support block 21 can be suppressed when the thickness of the fusion parts is 20 μm or less is obtained. Therefore, on the basis of the first and second knowledge, it is preferable that the thickness of the fusion parts B1, B2 is 3 μm or more and 20 μm or less so as to raise the adhesion strength of the first protective thin film 49 (or 53) and the second protective thin film 57 (or 59) with suppressing the deformation of the base of the first support block 21.

Meanwhile, horizontal axes of FIG. 4 and FIG. 5 indicate logarithms of thicknesses of the fusion parts, a vertical axis of FIG. 4 indicates dimensionless numbers of adhesion strengths of the thin films, and a vertical axis of FIG. 5 indicates dimensionless numbers of deformation of the bases of the subject bodies 1.

Next, action of the embodiment of the present invention will be described.

The front portion of the platform 9 is made supported by the first protective thin film 49 (or 53) of the first support block 21, the rear portion of the platform 9 by the second protective thin film 57 (or 59), the suction side 5fb of the blade 5 by the first support roller 25, the rear edge of the shroud 7 by the second support roller 29, and the front edge of the shroud 7 by the support bolt 33. Then, the portion near the proximal end of the blade 5 is pressed toward the base stand 17 via the rubber pad 41 by the pressure bolt 43, and the blade root 11 is cramped by the pair of clamp bars 45, 47 from the front and the rear. Thereby, the blade component 3 is fixed to the jig main body 15. More specifically, the arm 37, the pressure bolt 43, the support roller 25, 29 and the pair of clamp bars 45, 47 fix the blade component 3 in cooperation with the support blocks 21, 23. Thereby, the blade component 3 can be provided for treatments such as machining (a general action of the jig 1).

Other than the general action of the jig 1, as the first protective thin film 49 of TiC or the first protective thin film 53 of SiC is formed on the support face of the first support block 21 and the second protective thin film 57 of TiC or the second protective thin film 59 is formed on the support face of the second support block 23, the first protective thin film 49 (or 53) and the second protective thin film 57 (or 59) have high hardness so that abrasion of the first support block 21 and the second support block 23 is sufficiently suppressed without application of any costly material such as a hard alloy to a constitutional material of the first support block 21 and the second support block 23.

Further, as the first protective thin film 49 (or 53) of the first support block 21 and the second protective thin film 57 (or 59) of the second support block 23 are formed by discharge deposition, rounded fine roughness is given to and ranges over the whole of surfaces of the first protective thin film 49 (or 53) and the second protective thin film 57 (or 53). Thereby, slipping of the blade component 3 is suppressed and the whole of the surfaces of the first protective thin film 53 (or 55) and the second protective thin film 57 (or 59) are made in substantially equal contact with the platform 9 with stabilizing the condition of setting of the blade component 3.

Further, as thickness of the fusion parts B1, B2 is made 3 µm or larger and 20 µm or smaller, adhesion strength of the first protective thin film 49 (or 53) and the second protective thin film 57 (or 59) can be increased with suppressing deformation of the base of the first support block 21 and the second support block 23.

In accordance with the aforementioned embodiment of the present invention, as abrasion of the first support block 21 and the second support block 23 can be sufficiently suppressed without applying any costly material such as a hard alloy to one of constitutional materials of the first support block 21 and the second support block 23, production costs of the jig 1 as a whole can be reduced.

Further, the whole of the surfaces of the first protective thin film 49 (or 53) and the second protective thin film 57 (or 59) can be made in substantially equal contact with the platform 9 with stabilizing the fixation condition of the blade component 3, scratch on the blade component 3 becomes rare even though it contacts the first support block 21 or the second support block 23 and therefore quality of the blade component 3 can be improved.

Further, adhesion strength of the first protective thin film 49 (or 53) and the second protective thin film 57 (or 59) can be increased with suppressing deformation of the base of the first support block 21 and the second support block 23, quality of the jig 1 can be stabilized.

In the above explanation, the first support roller 25, the second support roller 29 and the support bolt 33 may be constituted in similar ways to the first support block 21 or the support block 23.

Further, other than the jig 1 for use at a time of machining, to a jig for use at a time of inspection or such, a constitution similar to the first support block 21 and the second support block 23 may be applied.

Although the invention has been described above by reference to certain embodiments of the invention, the invention is not limited to the embodiments described above. Modifications and variations of the embodiments described above will occur to those skilled in the art, in light of the above teachings.

INDUSTRIAL APPLICABILITY

The present invention provides a jig which effectively suppresses saccadic movement of a subject body without applying a hard metal and further fixes the subject body with giving small abrasion and deformation thereto.

The invention claimed is:

1. A jig for fixing a subject body, comprising:
a main body including a base plate and a vertical plate standing vertically from the base plate;
a bracket on the base plate including a support roller and a support bolt, the support roller and the support bolt being so disposed as to retain the subject body horizontally in place;
a support block on the base plate including a support face configured to come in contact with the subject body;
an arm projecting from the vertical plate to hang over the subject body and being so disposed as to fix the subject body in between the arm and the support block; and
a coating including a ceramic, the coating being discharge-deposited on the support face.

2. The jig of claim 1, wherein the coating has a roughness of 0.4 µm or more and 3.2 µm or less in Ra.

3. The jig of claim 1, wherein the coating consists essentially of one selected from the group of titanium carbide, silicon carbide and tungsten carbide.

4. The jig of claim 1, wherein the coating is discharge-deposited from a working electrode consisting essentially of titanium carbide onto the support face with the support block as a workpiece.

5. The jig of claim 1, wherein the coating is discharge-deposited from a working electrode consisting essentially of silicon onto the support face in an oil with the support block as a workpiece.

6. The jig of claim 1, wherein the coating is formed only on the support face.

7. The jig of claim 1, further comprising:
a fusion part between the coating and a base of the support block, a thickness of the fusion part being 3 µm to 20 µm.

8. The jig of claim 1, wherein the subject body is a turbine blade.

9. The jig of claim 1, wherein one end of the arm includes an installation bolt to connect the arm to the vertical plate, and another end of the arm includes a pressure bolt that presses a portion of the subject body toward the base plate.

10. The jig of claim 9, further comprising:
a rubber pad provided between the pressure bolt and the subject body.

* * * * *